United States Patent [19]
Richardson et al.

[11] 3,826,312
[45] July 30, 1974

[54] SELF-NEUTRALIZING WELL ACIDIZING

[75] Inventors: Edwin A. Richardson, Houston;
Ronald F. Scheuerman, Bellaire, both of Tex.

[73] Assignee: Shell Oil Company, Houston, Tex.

[22] Filed: July 24, 1972

[21] Appl. No.: 274,778

[52] U.S. Cl. .......................... 166/307, 252/8.55 C
[51] Int. Cl. ..................... E21b 43/16, E21b 43/25
[58] Field of Search ........... 166/270, 271, 300, 307, 166/312, 281, 304; 252/8.55 C

[56] References Cited
UNITED STATES PATENTS

| | | | |
|---|---|---|---|
| 2,094,479 | 9/1937 | Vandergrift | 166/271 |
| 2,152,306 | 3/1939 | Grebe et al. | 252/8.55 C |
| 2,175,095 | 10/1939 | Stoesser | 166/307 |
| 2,640,810 | 6/1953 | Cardwell et al. | 166/307 |
| 3,122,204 | 2/1964 | Oakes | 252/8.55 C |
| 3,251,415 | 5/1966 | Bombaroieri et al. | 166/307 |
| 3,482,636 | 12/1969 | Crowe | 166/307 |
| 3,528,503 | 9/1970 | Crowe | 166/307 |
| 3,719,229 | 3/1973 | Tate | 252/8.55 C |

OTHER PUBLICATIONS

Van Poollen, "How Acids Behave in Solution," The Oil and Gas Journal, Sept. 25, 1967, pp. 100–102.

*Primary Examiner*—Henry C. Sutherland
*Assistant Examiner*—Jack E. Ebel
*Attorney, Agent, or Firm*—Howard W. Coryell

[57] ABSTRACT

A process for acidizing a subterranean region by contacting it with an acidic solution is improved by dissolving in the solution a pH-increasing reactant that subsequently adjusts the pH of the solution to a selected relatively neutral value.

10 Claims, 2 Drawing Figures

SELF-NEUTRALIZING WELL ACIDIZING

BACKGROUND OF THE INVENTION

This invention relates to a well acidizing process. More particularly, it relates to the contacting of a subterranean region with an acidic solution that is self-neutralizing.

Well acidization is a known and widely used technique. It is commonly used to increase the permeability of a subterranean reservoir and/or the perforation tunnels extending between a well borehole and a reservoir. It is effected by simply displacing the acidic solution into the region to be acidized.

The well acidizing solutions are usually aqueous solutions of one or more inorganic or organic acids. The most commonly used acids are hydrochloric acid or mixtures of hydrochloric and hydrofluoric acids. Other acids such as acetic, citric, formic, sulfamic, etc., are used, individually or with hydrochloric or hydrofluoric acids, usually for specialized purposes. The concentrations of well acidizing solutions commonly range from relatively dilute solutions, such as those containing in the order of ½ percent by weight of hydrochloric acid to concentrated solutions such as those containing about 30 percent or more of such an acid.

The conventional acidizing solutions often contain one or more of various additives. Inhibitors are commonly used for reducing the rate of acid attack on tubing strings and other metal equipment in the well. The inhibitors are usually used in amounts of less than about 1 to 2 percent by weight of the acidizing solutions and commonly comprise compounds of arsenic or copper or water soluble organic compounds containing easily oxidizable groups, such as nitrogen or sulfur containing groups. Interfacial tension lowering surfactants are commonly used to enhance the penetration of the solution into the pores of the rocks or through films of oil that may cover acid-reactive material in the region to be acidized. Demulsifying surfactants are commonly used to enhance the breaking or separation of oil-in-water emulsions that tend to be formed by various crude oils when they are contacted by an acidizing solution. Silicate precipitation preventing materials, such as glycols, glycol ethers or the like, are commonly used in the so-called "mud acid" solutions that contain hydrogen fluoride or a material that releases hydrogen fluoride into the solution. Acidization rate retardants, such as water thickening agents, are commonly used to allow a deeper penetration of the solution into a reservoir. Other additives, such as fluid loss control materials, or the like, are also used in relatively special circumstances.

In a U.S. patent filed over 75 years ago, U.S. Pat. No. 556,609, it was disclosed that in acidizing to increase the flow of an oil well, all of the acid may not be neutralized during its reaction with the reservoir rock and, thus, it may be desirable to inject an alkaline liquid behind the acidizing solution in order to complete the neutralization. Various ways of utilizing separate slugs of acidizing solutions and acid neutralizing solutions in conjunction with spacers, gravity differences, or the like, in order to improve the control of the location or the extent of the neutralization, or the dissolving of insoluble silicate materials that may have been left by a mud-acid formulation, have been suggested in U.S. Pat. Nos. such as 2,001,350; 2,038,956; 2,152,306; 2,161,085, etc. The inhomogeneities in subterranean regions and the tendencies of different fluids to flow into different portions or differently sized pores of such regions make it difficult and often impossible to ensure that a first injected fluid is ever thoroughly mixed with a second injected fluid.

A primary object of the present invention is to provide an acidizing solution that is self-neutralizing so that the neutralization of each increment is ensured and is not dependent upon the acidizing solution being mixed with a subsequently injected fluid.

SUMMARY OF THE INVENTION

This invention relates to treating a well by contacting a subterranean region with an aqueous acidic solution containing a dissolved ph-increasing reactant that subsequently adjusts the pH of the solution to a selected value.

DESCRIPTION OF THE INVENTION

Figure 1:
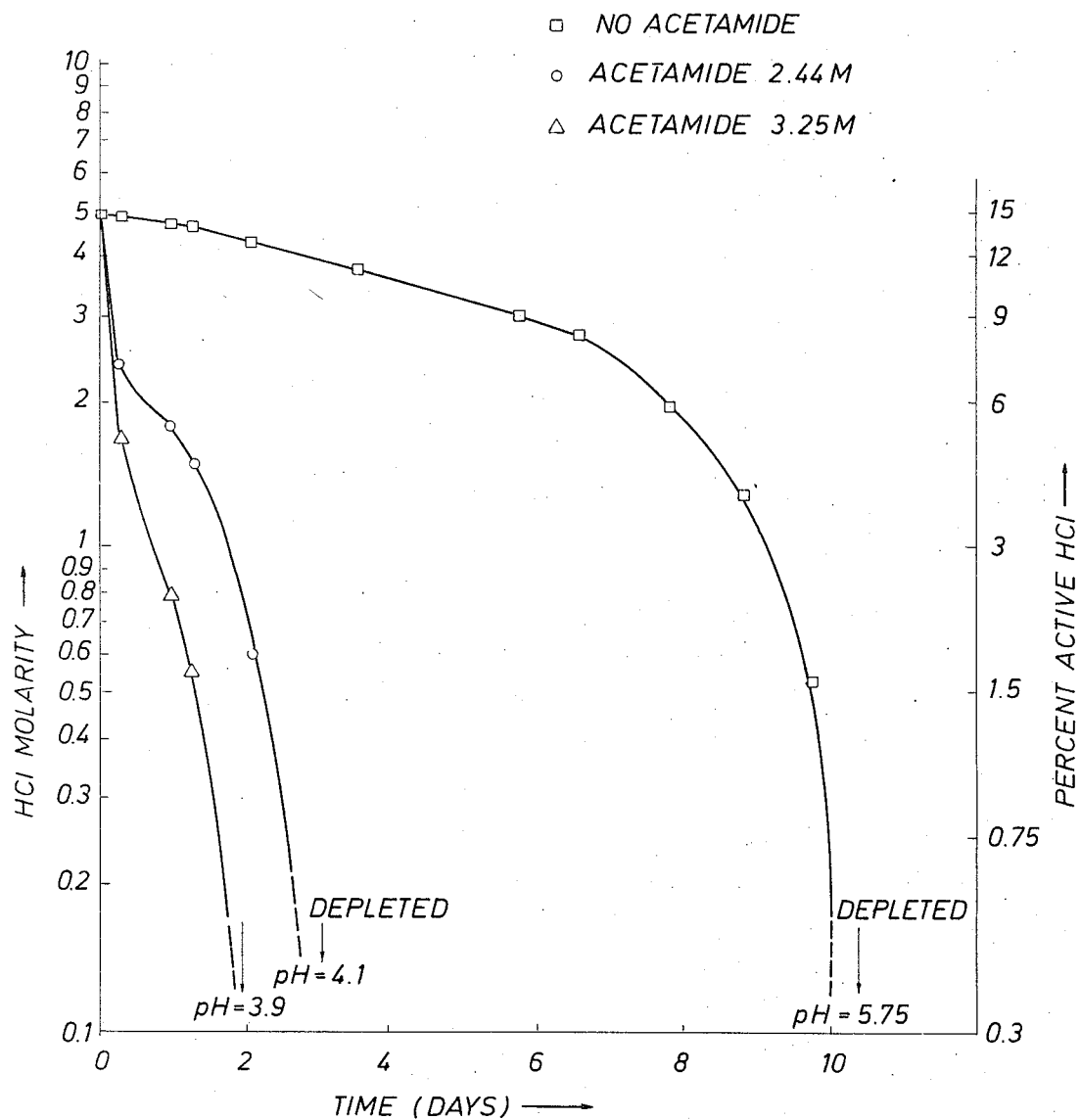
FIG. 1 shows the variation of extent of self-neutralization with time for specific self-neutralizing acid solutions.

The acidic solution used in the present invention can comprise substantially any aqueous solution, of one or more inorganic or organic acids, which solution is adapted to react with and dissolve materials encountered in a subterranean region in and around the borehole of a well. Such a solution can be formed from those which are commercially available, e.g., from well treating service companies, including acidizing solutions containing substantially any of the conventionally used additives.

In general, a pH-increasing reactant which is suitable for use in this invention is substantially any water soluble compound or mixture which reacts within an aqueous solution to produce a water-soluble alkaline reaction product that increases the pH of the solution by neutralizing or spending the acidity of the solution. Suitable pH-increasing reactant materials include water-soluble amides of carbamic acid, such as ammonium carbamate and its nitrogen-substituted homologues; urea, the nitrogen-substituted homologues of urea; salts of cyanic acid such as the alkali metal cyanates; cyanamide; the addition products of ammonia or amines with formaldehyde, such as tetramethylene tetramine; amides of carboxylic acids, such as formamide, acetamide, etc.; or the like.

In a preferred procedure for practicing the present invention, an acidizing solution, such as one which is commercially available from a service company, is selected or compounded to have a concentration and rate of reaction suitable for the temperature and purpose of a particular well acidization treatment of materials within a subterranean region. The compatibility of the selected acidizing solution with at least one pH-increasing reactant is determined. A self-neutralizing acidizing solution of the present invention is formed by dissolving in the selected acidizing solution a pH-increasing reactant that (a) is compatible with the acidizing solution components, (b) has a reaction rate that is adapted to delay the self-neutralization of the acidity of the solution long enough to ensure the desired acidization in the subterranean region, and (c) is dissolved in an amount sufficient to subsequently increase the pH of the solution to a selected value. The desired acidization is effected by pumping the self-neutralizing acidizing solution into the subterranean region in time to allow the occurrance of the acidization prior to the self-neutralization.

The present invention is particularly useful in using a relatively dilute acidizing solution for cleaning or preflushing materials within a subterranean region. Such dilute acids are used for example, in cleaning or preflushing sand or gravel packs and/or the adjacent casing perforations and/or the adjacent reservoir rock in order to ensure a uniform penetration of a fluid, such as a sand consolidating solution or thief zone plugging solution, or the like. In such operations, or in other well acidization treatments in which it may be difficult to estimate how much of the acidity of the acidizing solution will be neutralized in the course of the desired acidization treatment, it is relatively easy to incorporate enough pH-increasing reactant to subsequently provide a pH of from about 2–6 even though none of the acid in the acidizing solution was neutralized by components of the subterranean region. If a relatively large volume of acidizing solution is being injected and/or the subterranean region being treated contains a relatively large amount of acid reactive materials, little or no self-neutralization may be needed with respect to the first injected portion of the acidic solution. In general, where aqueous liquids, such as acidizing solutions, are injected at a substantially continuous rate, those liquids tend to move as a train of radially expanding rings or slugs. The first injected portions of such liquids to remain in front and to become the most widely dispersed within the reservoir. In a well acidizing process, each portion of acid that follows the first portion encounters a region in which acid reactive components have been neutralized. In an overall injection-then-backflow operation for treating a well with acid, the last injected portion tends to remain for the shortest time in contact within the reservoir. In acidizing a well a series of acids may be used. For example, a strong hydrochloric acid solution, such as a 15 or 30 percent solution, may be injected in order to dissolve a significant portion of carbonate materials in the rock, and may be followed by a portion of mud acid that will dissolve the clay particles in the near vicinity of the well.

In operating the present invention, it may be desirable to adjust the concentration and type of pH-increasing reactant so that a faster and more complete self-neutralization is affected in the last-injected portion of the acidic solution. In general, in treating a production well, the volume of the self-neutralizing portion of the acidic solution is preferably sufficient to permeate the region immediately adjacent to the well and the neutralizing effect is sufficient to spend at least about 20 percent of the total acidity of the acidic solution and to increase the solution pH to at least about 2. Where a significant volume of one or more acidic solutions is injected, the composition and/or concentration of the pH-increasing reactant is preferably adjusted so that the quickest and most complete self-neutralization occurs within the portions that are last injected.

Where the present self-neutralizing acidizing solutions are used in conjunction with other well treating solutions, such as sand consolidating, thief zone plugging, or the like solutions, it may be desirable to arrange the components of the various solutions to isolate the self-neutralizing acidizing solutions from the other treatment solutions by means of inert spacer and/or to include treatment-enhancing liquids. For example, a mud acidizing solution (which may be, or may be followed by, a self-neutralizing mud acid solution) is preferably followed by an aqueous solution of an ammonium salt, such as ammonium chloride. Such a following solution tends to avoid a possibe mixing of sodium or potassium ions with the dissolved-silica-containing mud acid solution and causing the precipitation of compounds such as $Na_2SiF_6$ or $K_2SiF_6$, etc.

In general, the concentration of the pH-increasing reactants in the present self-neutralizing acidizing solutions can range from (a) relatively small amounts that are adapted to neutralize only a relatively small but significant proportion of the acidity (for example, as little as about 20 percent, where the remainder of the acidity will be spent by acid reactive components of the subterranean region) to (b) more than neutralize all of the acidity (for example, enough to increase the pH above 7, where an alkaline solution is desirable). Increasing amounts of a pH-increasing reactant increase both the rate of neutralization and the extent of neutralization of the acidity. In addition, the presence of an amino-nitrogen-containing pH-increasing reactant tends to retard the corrosion of metal conduits, etc. Such a material increases the inhibition provided by the conventional type of corrosion inhibitors and/or provides a corrosion inhibition in the absence of a conventional inhibitor. In general, where the treatment time is short and/or a high pH is desirable, the amount of pH-increasing reactant, can be substantially as large as is economically feasible (up to and including supersaturated solutions), limited only by the need for all of the acidizing solution components to be dissolved by the time the solution arrives at the subterranean reservoir being treated.

The present invention provides a well treatment process comprising flowing an aqueous solution into a remote zone, adjusting the solution composition to provide a selected concentration of acid in the solution within that zone and maintaining the pH of the solution within that zone at a selected value. In this process, the aqueous solution initially contains at least one acid and at least one pH-increasing reactant that are dissolved in the solution in proportions that are correlated with the temperature of the remote zone and the travel time of an increment of solution flowing into the zone. The solution composition is adjusted by reacting the pH-increasing reactant with water and acid to reduce the concentration of acid to the selected value in each increment of the solution while the increment is within the zone. The pH of the solution within the zone is maintained at a selected value by forming within each increment of the solution a buffered system having a pH that tends to remain constant with time and/or encounters with acidic or basic materials. The process can be effected by inflowing a slug of the solution into the zone and allowing it to remain static until the pH adjustment is effected and/or by continuing to flow the solution through the zone at a rate such that the selected pH is attained within each increment while the increment is within the zone. The buffering is preferably effected by a combination of pH-increasing reactants such as a combination of an amide and a urea (i.e., urea or a N-substituted urea). For example, by using different ratios of acetamide and urea, different buffered pH's can be produced and maintained in a given acid solution at a given temperature. Where a 7.5 percent HCl solution (about 2.4 N hydrochloric acid) contains 1.65 M per liter urea and 1.5 M per liter acetamide and is maintained at a temperature of 168°F, within about 3 days the solution pH increases (from an initial value of less than 0.1) to about 3 (with the acidity being substantially completely spent, since a 0.01 N hydrochloric acid has a pH of only 2) and is effectively buffered at about 4 or 5 (since the equilibrium pH of the solution is about 6).

Well Treatment Example

A well such as one that produces about 99 barrels of oil per day in the form of an oil-water mixture containing only about 7 percent oil, where the reservoir has a temperature of about 168°F, and the well borehole has been cased, perforated and gravel-packed, can advantageously be improved by an acidization followed by a fine-particle-immobilizing sand-consolidating treatment. Such a treatment can be applied to such a well that is being gas-lifted with the gas-lift valves remaining in place. The well is sounded and bailed if necessary. Where the gas-lift valves are left in place, the treatment is effected by holding pressure on the casing. The following fluids are each injected at a rate of about 1/4 barrel per minute: (1) about 200 gallons of xylene, to miscibly displace oil and the like away from the treatment zone; (2) about 300 gallons of 7.5 percent by weight hydrochloric acid containing about 8 moles per liter of urea, to clean the perforation tunnels and the like with a self-neutralizing acidizing solution, (3) about 1,000 gallons 7.5 percent by weight hydrochloric acid containing about 1.5 percent by weight hydrogen fluoride and about 8 moles per liter of urea, as a self-neutralizing mud acidizing solution for dissolving clays and fines, etc., in order to increase the permeability of the reservoir and/or free the gravel pack of pore plugging clay particles; (4) about 200 gallons of an aqueous solution of about 14 percent by weight of ammonium chloride, as a supplemental treating solution to prevent a sodium or potassium ion-induced precipitation of the silica dissolved by the mud acid; (5) about 200 gallons of an aqueous 17 percent by weight potassium chloride solution, as an inert spacer solution; (6) an aqueous sand consolidating solution for consolidating the earth formation sand grains to an extent sufficient to immobilize the fine particles; and (7) about one injection tubing string volume of diesel oil, to displace the preceding solutions into the reservoir. When a so-treated well is shut in, for at least about 4 days, and then is produced, the pH of the produced water and spend acid will be in the range of 6.5 to 8.5, eliminating any difficulties due to unspent acid in contact with the reservoir crude and/or the metal conduits in the well.

Delayed Self-Neutralization

FIG. 1 shows the decrease in extent of acidity with time in various aqueous 15 percent by weight hydrochloric acid solutions which contain various amounts and types of pH-increasing reactants and are maintained at 168°F. Each of the solutions contains 4.9 moles per liter of urea, one contains an intermediate amount of acetamide (about equivalent to ½ the molarity of the acid) and one contains a larger amount of acetamide (equivalent to about 2/3 the molarity of the hydrochloric acid). At 168°F, these formulations provide self-neutralizing acidizing solutions in which the acidity is essentially completely depleted (to provide a pH of at least about 4) within times ranging from about 2 to about 10 days.

Effect of Concentration and Temperature on Self-Neutralization Time

Figure 2:
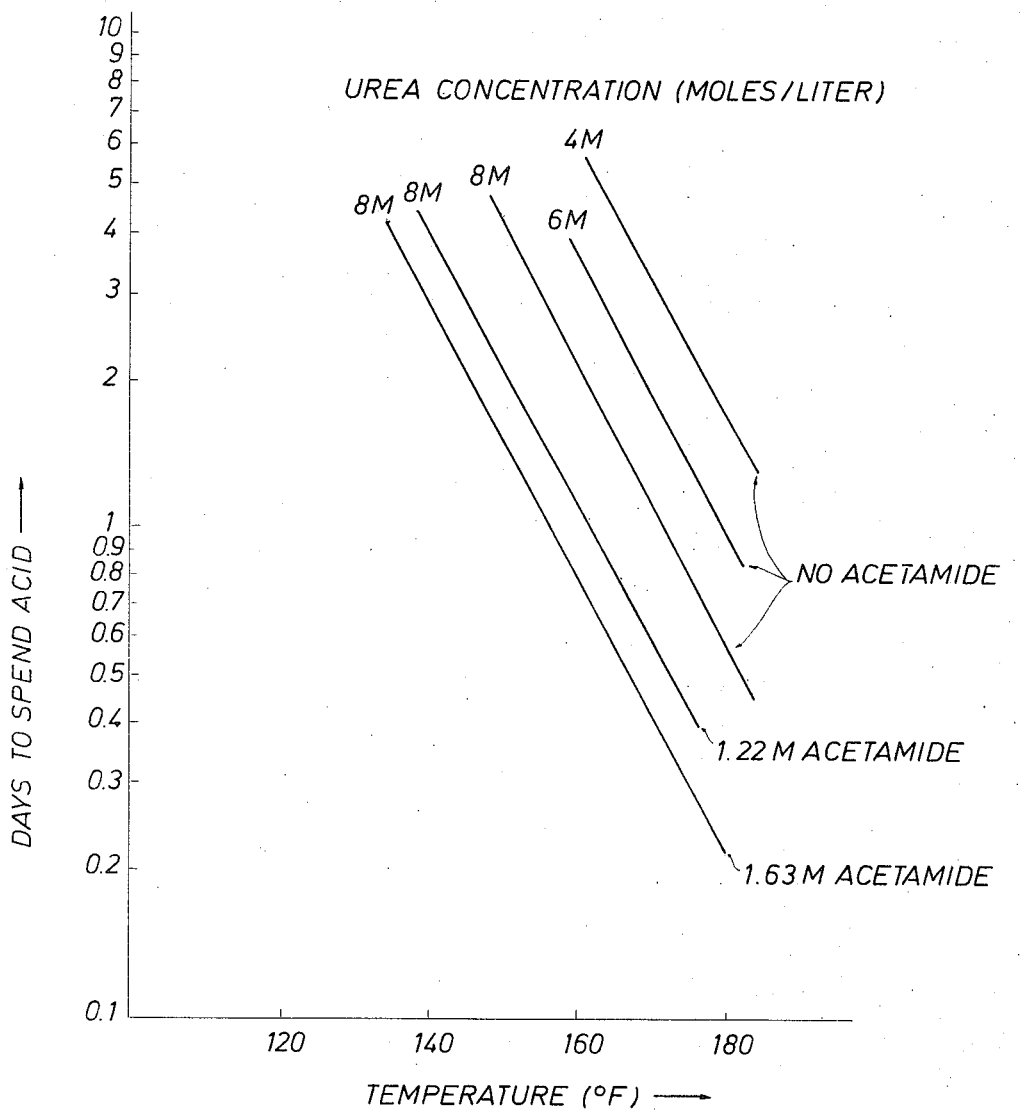
FIG. 2 shows the variation of time required for self-neutralization with temperature for specific self-neutralizing solution.

FIG. 2 shows the decrease of the times required for a series of aqueous solutions (each containing 7.5 percent by weight hydrochloric acid and the indicated amounts of urea and acetamide) to become self-neutralized at the indicated temperatures. Note that stoichiometric excesses of one or more pH-increasing reactants can be utilized to provide a relatively wide range of self-neutralization times at a relatively wide range of temperatures.

In some well acidizing situations the presence of iron, or the like multivalent metal ions, may be a problem. The acidizing fluid tends to dissolve materials containing such ions but those ions tend to be precipitated, usually as hydroxides, when the acids become spent and the pH of the solutions begin to rise. Ferric hydroxide may begin to precipitate at a pH of 2. In the present process such a precipitation can be avoided by dissolving in the acidizing solution at least one chelating agent that is compatible with the other components of the solution and is effective in forming soluble chelates with the multivalent ions that are apt to be encountered at the temperature and pH that are apt to be present in the self-neutralized spent acid. As known to those skilled in the art, the particular downhole conditions should be considered, for example, in the manner described in the article "Secondary Deposition of Iron Compounds Following Acidizing Treatments" by Smith, Crowe and Nolan, SPE paper 2358, SPE Reg. Mtg. Charleston, W. Va., Nov. 7–8, 1968. Suitable chelating agents include ethylenediaminetetraacetic acid, malonic acid, tartaric acid, citric acid and the like chelating agents.

What is claimed is:

1. In a process for treating materials in a subterranean region by contacting those materials with at least one acidic solution, the improvement which comprises: prior to contacting the materials, dissolving in said acidic solution at least one pH-increasing reactant that subsequently neutralizes at least a significant portion of the acidity that remains in the solution after the materials have been contacted by the solution.

2. In a process for treating materials in a subterranean region by contacting those materials with at least one acidic solution, the steps of:

compounding an acidic solution having a concentration and rate of reaction correlated with the treatment desired and the composition and temperature of the subterranean region;

dissolving in at least the last injected portion of said acidic solution a pH-increasing reactant that (a) is compatible with the acidic solution, (b) has a reaction rate adapted to delay a subsequent neutralization of acidity long enough to ensure the subterranean treatment desired, and (c) is dissolved in an amount sufficient to neutralize substantially all of the acidity remaining after the desired subterranean treatment; and pumping the resultant self-neutralizing acidic solution into said subterranean region in time to allow the occurrence of the desired treatment prior to said neutralization of acidity.

3. The process of claim 1 in which a series of portions of said acidic solution is injected and the pH-increasing reactant is dissolved in only the later injected portions of said solution.

4. The process of claim 1 in which said subterranean materials are contacted with at least two acidic solutions and the rate of reaction of the pH-increasing reactant dissolved in the later injected acidic solutions exceeds the rate of reaction of any pH-increasing reactant in the earlier injected acidic solutions.

5. The process of claim 4 in which at least one of said acidic solutions is a mud acid.

6. The process of claim 1 in which said acidic solution is a hydrochloric acid solution and said pH-increasing reactant is urea.

7. The process of claim 1 in which said acidic solution is a hydrochloric-hydroflouric acid solution and said pH-increasing reactant is urea.

8. The process of claim 1 in which said acidic solution is a hydrochloric acid solution and said pH-increasing reactant is a mixture of urea and acetamide.

9. A well treating process which comprises:
flowing an aqueous acidizing solution that contains at least one acid and at least one pH-increasing reactant into a subterranean zone;
prior to flowing said solution into the subterranean zone adjusting the composition of said solution to provide a selected effective concentration of acid in portions of the solution within said zone; and
prior to flowing said solution into the subterranean zone adjusting the composition of said solution to provide a pH of the solution within said zone that increases to a selected relatively neutral value of from about 3 to 6.

10. The process of claim 9 in which said provision of the pH is effected by providing a solution composition adapted for forming a buffered system that has a pH within said selected relatively neutral value of from about 3 to 6.

* * * * *